United States Patent Office 3,153,578
Patented Oct. 20, 1964

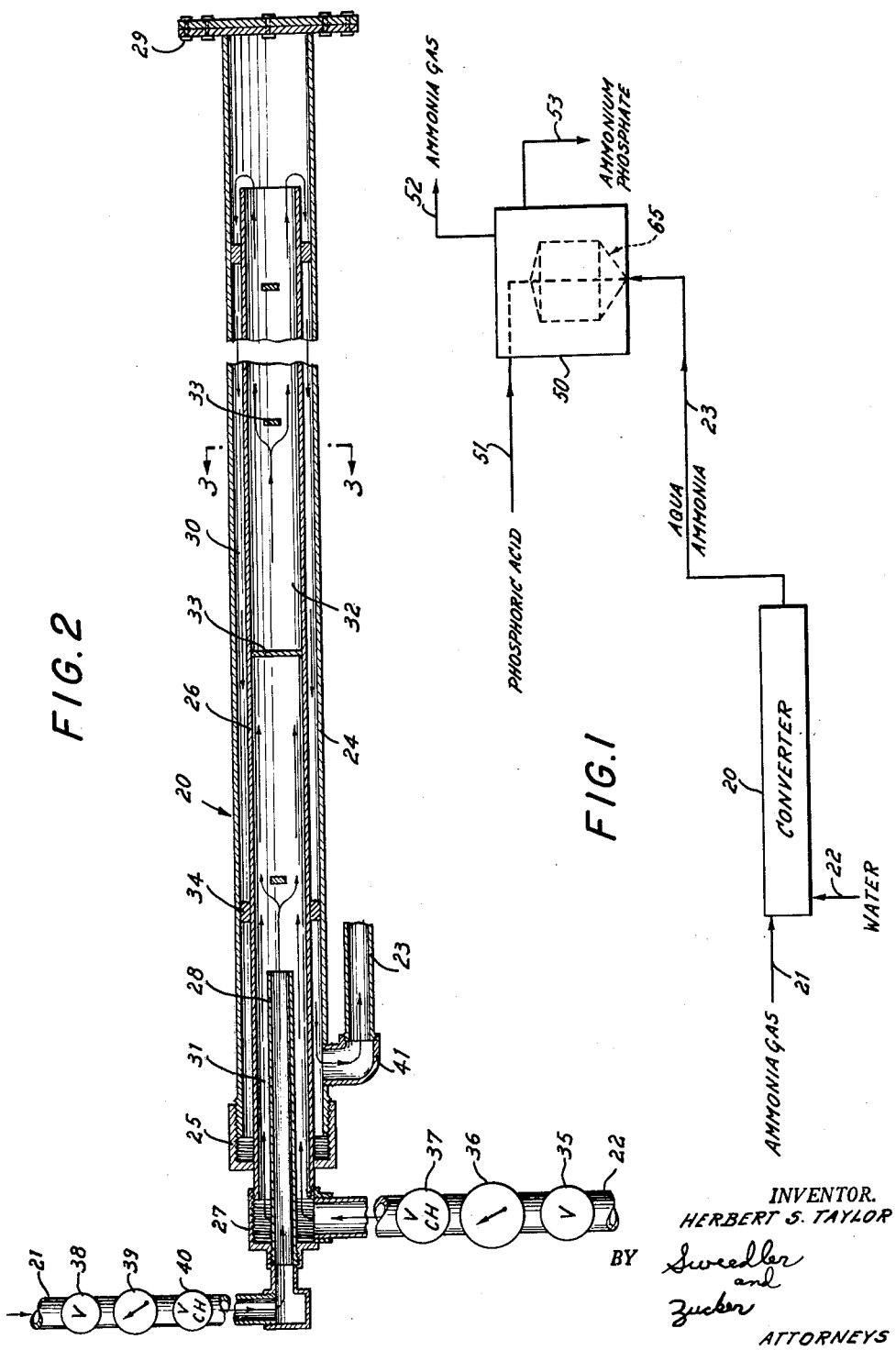

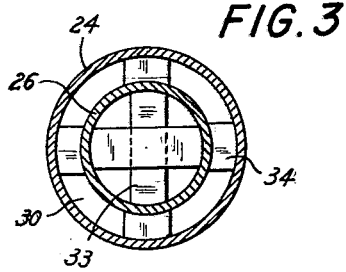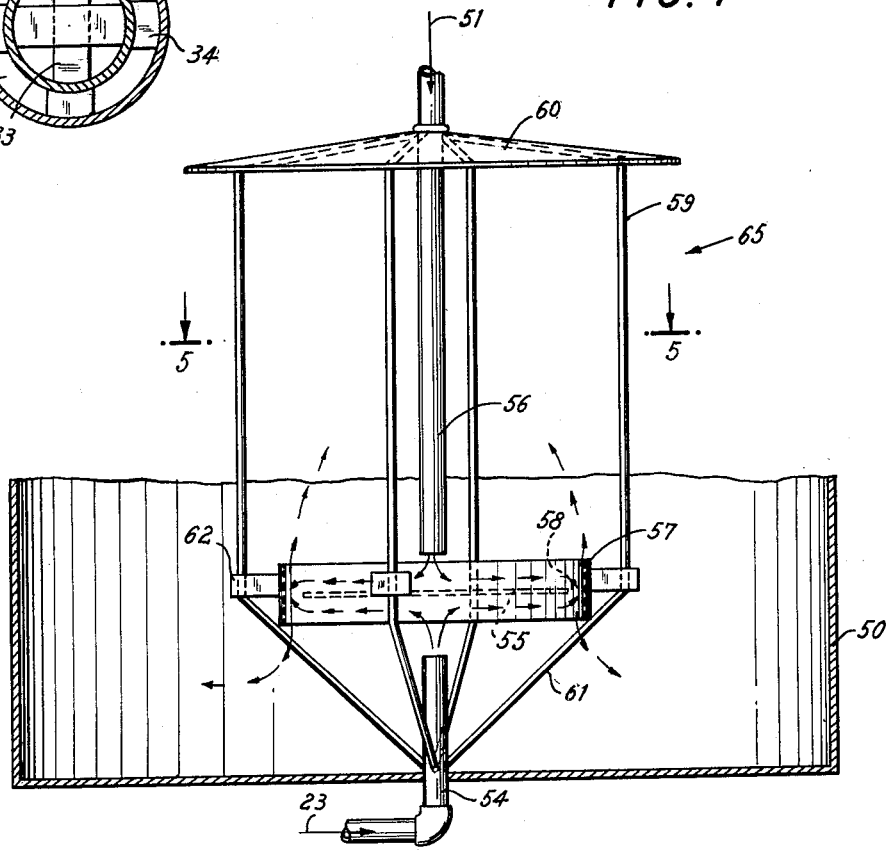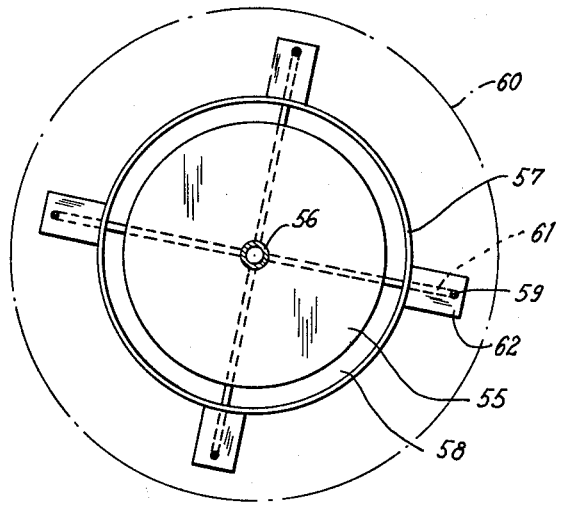

3,153,578
REACTOR APPARATUS
Herbert S. Taylor, Woodland, Calif., assignor, by mesne assignments, to D. W. Galbraith, trustee for the stockholders of Agriform Chemical Company, Inc.
Filed Nov. 3, 1959, Ser. No. 850,642
7 Claims. (Cl. 23—260)

This invention relates to apparatus useful in the manufacture of fertilizers, and particularly useful in the production of ammonium phosphate from ammonia and phosphoric acid.

It is of course known to react ammonia gas with an aqueous phosphoric acid liquor to produce the various ammonium phosphates. Such a process is disclosed in United States Patent 1,999,026 to Tramm et al., for example.

The reaction of ammonia and phosphoric acid is quite rapid and highly exothermic. These characteristics have created several difficulties in the operation of prior art reaction systems. For example, there has been a tendency for the acid and ammonia to react initially at or near their respective reactor entry ports, thereby creating crystal formations on inlet pipes, nozzles, or the like, clogging reactor flow after varying periods of time and necessitating the inclusion of mechanical agitators in the tank. Additionally, the tremendous heats produced by dissolution of ammonia in water (heat of solution equals 8.28 kg. cal./mol) and the reaction of aqua ammonia with phosphoric acid to produce dibasic ammonium phosphate (heat of reaction equals 52.64 kg. cal./mol) have created violent reactions presenting mixing, heat transfer, and reactor construction problems. Thus, prior systems have been compelled to make use of expensive stainless steel reactor structures to avoid damage to vessels contacted by the boiling, corrosive phosphoric acid.

It is an object of the present invention to provide a simple, inexpensive reaction system for manufacturing ammonium phosphate from gaseous ammonia and phosphoric acid.

An additional object of this invention is to provide a reaction system for ammonium phosphate production which will effect smooth, thorough mixing of reactants and retain uniform heat transfer characteristics, without utilization of mechanical stirring.

A further object of this invention is to provide a simple, inexpensive ammonium phosphate reactor in which the use of expensive, corrosion-resistant materials for reactor surfaces is greatly curtailed.

Another object of the present invention is to provide a reactor for aqua ammonia and phosphoric acid in which there is no danger of crystal formation over inlet openings and no chance of constriction or clogging of reactor passages.

Other objects and advantages of this invention will appear obvious from the following detailed disclosure thereof.

It has been found that an efficient, inexpensive reaction system for ammonia gas and phosphoric acid may be provided to create uniform heat exchange in a limited reaction zone, without extensive use of non-corrosive materials or heat exchange means in the reaction system, and without the use of mechanical agitators. According to the present invention, the novel reaction system comprises an ammonia gas converter, wherein ammonia gas is dissolved in water to produce aqua ammonia and the heat of solution is transferred to the converter walls, and an ammonium phosphate reactor, comprising a tank having reagent inlets for aqua ammonia produced by the converter, and for phosphoric acid, a corrosion-resistant deflector plate within the tank positioned opposite the inlet and control means adjacent the deflector plate for restricting the reaction to a limited zone surrounding the deflector plate. Preferably, the ammonium phosphate reactor contains a mixing zone surrounding the zone of reaction, bounded by a surge hood, into which the reactants boil from the reaction zone and in which vigorous and thorough mixing occurs without added mechanical agitation, and discharge means for excess vapor and final product removal.

The invention will be more easily understood from a consideration of the following illustrative, non-limiting, embodiment described below and depicted in the attached drawing wherein:

FIGURE 1 is a schematic representation of the reaction system of the invention;
FIGURE 2 is a sectional elevation of ammonia converter 20 of FIGURE 1;
FIGURE 3 is a vertical section taken along line 3—3' of FIGURE 2;
FIGURE 4 is a diagrammatic elevation, partially in section, of the ammonium phosphate reactor 50 of FIGURE 1; and
FIGURE 5 is a horizontal section, taken along the line 5—5' of FIGURE 4.

Referring to FIGURE 1, a reaction system for manufacturing ammonium phosphate from ammonia vapor and phosphoric acid according to the invention is depicted. The system includes an ammonia converter 20 which dissolves input ammonia gas 21 in a water stream 22 to produce an aqua ammonia stream 23. The last mentioned stream passes to an ammonium phosphate reactor tank 50 containing reactor unit 65 wherein it is mixed with a phosphoric acid stream 51 and the ammonium phosphate fertilizer stream 53 is produced. Suitable venting means may be provided to remove the excess ammonia vapor at 52.

With reference now to FIGURE 2, the ammonia converter, indicated generally at 20, comprises a plurality of concentric conduits 24, 26 and 28 suitably joined at one end by the coupling members 25 and 27. The exterior conduit 24 may be flanged at its other end and sealed by a plate fastened by the bolts 29. The intermediate open conduit 26 extends the greater portion of the length of the exterior conduit 24, forming an annular chamber 30 therebetween. The interior open conduit 28 extends the minor portion of the length of the intermediate conduit 26, forming an annulus 31 therebetween. A baffle chamber 32 forms the interior of the remaining major portion of the conduit 26.

The baffle chamber 32 contains a plurality of evenly spaced baffles 33 staggered in positions such that the axes of adjacent baffles are at right angles to one another, as may best be seen in FIGURE 3. A plurality of aligning supports 34 are located at spaced intervals in the annular chamber 30, holding the exterior conduit 24 and the intermediate conduit 26 fixed, concentric of each other.

A water inlet pipe 22 is joined to the converter 20 through a coupling 27. The inlet pipe possesses in series, a valve 35, a flow meter 36 and a check valve 37; the valve 35 regulates the flow of the input stream. An ammonia gas inlet pipe 21 is connected to the interior conduit 28 through the coupling 27. The gas flows through a valve 38, a meter 39 and a check valve 40 in circuit with the pipe 21.

The exterior conduit 24 is joined, at a point adjacent the coupling 25, to an elbow 41 which elbow is joined to a product outlet pipe 23, which latter is connected to the input side of the ammonium phosphate reactor 50.

In operation, ammonia gas and water are passed simultaneously, in the direction of the arrows shown in FIG- URE 2, from the inlet streams into the ammonia converter 20 and through the interior conduit 28 and the annulus 31, respectively. The ammonia and water mix thoroughly to form aqua ammonia in the baffle chamber 32, wherein a vortex-like flow is created by the staggered baffles 33. The length of the chamber 32 is sufficient to insure adequate mixing and solution of the ammonia in the aqueous carrier. The product mixture thereafter flows through the annular chamber 30 to the elbow 41 and thence out the product outlet stream 23. It may be observed that heat is produced by the solution of the ammonia gas in water and is dissipated during passage through the converter 20 through the exterior conduit 24 to the atmosphere.

If the ammonia converter is used independently of the ammonium phosphate reactor unit 65, it may be desirable to direct the outlet stream 23 through a heat exchanger and then to storage. However, it will be noted that the simple construction of the converter 20, comprising essentially a plurality of concentric pipes without any moving parts or expensive structural elements, provides an economical means for preparing aqua ammonia for immediate reaction in the tank 50; for such reaction no added heat exchanger is necessary.

Referring now to FIGURES 4 and 5, the ammonium phosphate reactor unit 65 is housed within an exterior tank, indicated generally at 50, which may be cylindrical as depicted. The intake line 23 for aqua ammonia passes through an intake pipe 54 which enters the tank 50 approximately at its axis, the open end of the pipe extending vertically into the tank a short distance above the bottom thereof. A circular disc-like deflector plate 55, made of stainless steel or other corrosion-resistant material, is positioned in the horizontal plane above the pipe 54 and below an inlet pipe 56, which latter pipe extends vertically downward into the tank 50 from the top surface thereof. The inlet pipe 56, which is preferably made of stainless steel or other corrosion-resistant material, conveys the phosphoric acid stream 51 into the reactor unit 65. An open cylindrical reaction control ring or band 57 is concentric with the deflector plate 55 and defines an annular reaction zone 58 adjacent to the plate.

A surge hood 60 is mounted coaxial with the pipe 56 by the hood supports 59 and the supporting struts 61. The deflector plate 55 and the reaction control band 57 may be provided with suitable supports, such as the angle irons 62 welded to the hood supports 59, and interior struts (not shown) which secure the deflector plate and the reaction control band.

In operation, the reactor tank 50 is first filled, to within about a foot of the surge hood 60, with a mother liquor of phosphate product. Thereafter, phosphoric acid and aqua ammonia are introduced through the pipes 56 and 54, respectively, into the reactor unit wherein they strike the opposing surfaces of the deflector plate 55, flow to the circumferential edges of that plate, and meet and react in the reaction zone 58. The reaction is rapid and the phosphoric acid is largely consumed within the reaction zone, thereby permitting fabrication of supporting elements 59, 61 and 62 and the interior walls of the reactor tank 50 out of black iron or other materials subject to corrosion by the acid. Furthermore, the reaction control band is of such simple construction and is so located that it may be easily replaced whenever desirable; accordingly, it too may be made from black iron or similar material.

As the reaction proceeds, vigorous roiling in the reaction zone will produce thorough mixing throughout the tank as indicated by the arrows shown in FIGURE 4. The surge hood 60 serves to deflect the turbulent mixture toward the reaction zone and stimulate continuous eddy currents throughout the unit. Excess ammonia gas desorbed from the aqua ammonia may be vented from stack 52 and ammonium phosphate product collected by continuous or batch means at 53, as indicated in FIGURE 1.

It will be understood that the reactor described above is but illustrative of the present invention and that the invention is not limited to the reactor shown. For example, the tank 50 may have any shape, and the reaction zone may be disposed in a vertical or horizontal plane. Additionally, it may be desirable to add flow diverters to assist mixing in various tank shapes. Also, heat exchange means may be added to further control the roiling reaction and prevent vapor loss, or a scrubbing system may be utilized to condense materials contained in the vented gases.

What is claimed is:

1. A reactor comprising, in combination, a tank for a body of reaction mixture, a deflector plate fixedly mounted in said tank in a substantially horizontal plane, a reactant fluid feed line passing into said tank and having its discharge outlet positioned close to said plate near the central portion thereof so that fluid discharged from said feed line impinges on the central portion of one side of said plate and then flows toward the periphery thereof, a second reactant fluid feed line passing into said tank and having its discharge outlet positioned close to said plate near the central portion of the other side of said plate so that fluid discharged from said second feed line impinges on the central portion of said plate and then flows toward the periphery thereof, the two fluids meeting in the area adjacent the periphery of said plate, and a cylindrical band spaced from the periphery of said plate defining an annular reaction zone adjacent said plate.

2. An apparatus for producing ammonium phosphate from aqua ammonia and phosphoric acid reactants comprising, in combination, a tank for a body of reaction mixture, a deflector plate fixedly mounted in said tank in a substantially horizontal plane, a reactant fluid feed line passing into said tank and having its discharge outlet positioned close to said plate near the central portion thereof so that fluid discharged from said feed line impinges on the central portion of one side of said plate and then flows toward the periphery thereof, a second reactant fluid feed line passing into said tank and having its discharge outlet positioned close to said plate near the central portion of the other side of said plate so that fluid discharged from said second feed line impinges on the central portion of said plate and then flows toward the periphery thereof, the two fluids meeting in the area adjacent the periphery of said plate, a cylindrical band spaced from and bounding the periphery of said plate defining an annular reaction zone adjacent said plate, and a surge hood, concentric with but displaced from said annular reaction zone, for circulating said reaction mixture through said tank.

3. A reactor comprising, in combination, a tank for a body of reaction mixture, a disc-shaped deflector plate fixedly mounted in said tank in a substantially horizontal plane, an upstanding reactant inlet pipe extending through the base of said tank and having its discharge outlet positioned close to and substantially concentric of said plate so that reactant discharged therefrom impinges on one side of said plate and then flows toward the periphery thereof, a downwardly extending reactant inlet pipe extending into said tank and having its discharge outlet positioned close to and substantially concentric of said plate so that reactant discharged therefrom impinges on the opposite side of said plate and then flows toward the periphery thereof, the two reactants meeting in the area adjacent the periphery of said plate, a cylindrical band spaced from the periphery of said plate defining an annular reaction zone adjacent said plate, a surge hood fixedly mounted in said tank in a substantially horizontal plane above and spaced from said plate and said band, said surge hood supported by spaced struts extending from said upstanding pipe, and supporting means for said band extending from said struts.

4. An apparatus for converting ammonia vapor to aqua ammonia comprising, in combination, at least two concentric elongated conduits, inlet pipes for water and ammonia vapor reactants connected to one of the inner and outer of said conduits at one end thereof, said one of said conduits having imperforate walls throughout substantially its entire length defining a mixing chamber for said reactants and communicating at the end remote from said one end with one end of a conduit concentric therewith, said mixing chamber having baffle members spaced along the length thereof extending across the mixing chamber with the axis of each succeeding baffle member staggered relative to the adjacent baffle member to promote thorough mixing of the ammonia vapor and water reactants, and an outlet pipe for the reaction mixture communicating with one end of the other of said inner and outer conduits.

5. An apparatus for converting ammonia vapor to aqua ammonia comprising, in combination, a pair of concentric elongated conduits, inlet pipes for water and ammonia vapor reactants connected to one of said conduits at one end thereof, said one of said conduits having imperforate walls throughout substantially its entire length defining a mixing chamber for said reactants and communicating at the end remote from said one end with one end of the other conduit of said pair, said mixing chamber having baffle members spaced along the length thereof extending across the mixing chamber with the axis of each succeeding baffle member staggered relative to the adjacent baffle member to promote thorough mixing of the ammonia vapor and water reactants, and an outlet pipe for the reaction mixture communicating with the opposite end of said other conduit.

6. Reactor apparatus comprising, in combination, at least two concentric elongated conduits; inlet pipes for liquid and gaseous reactants connected to one of the inner and outer of said conduits at one end thereof; said one of said conduits having imperforate walls throughout substantially its entire length defining a mixing chamber for said reactants and communicating at the end remote from said one end with one end of a conduit concentric therewith; said mixing chamber having baffle members spaced along the length thereof extending across the mixing chamber with the axis of each succeeding baffle member staggered relative to the adjacent baffle member to promote thorough mixing of the gaseous and liquid reactants; an outlet pipe for the reaction mixture communicating with one end of the other of said inner and outer conduits; and a reactor communicably connected with the discharge end of said outlet pipe; said reactor comprising a tank for a body of reaction mixture, a deflector plate fixedly mounted in said tank in a substantially horizontal plane, the discharge end of said outlet pipe passing into said tank and being positioned close to said plate near the central portion thereof so that reaction mixture discharged therefrom impinges on the central portion of one side of said plate and then flows toward the periphery thereof, a reactant fluid feed line passing into said tank and having its discharge outlet positioned close to said plate near the central portion of the other side of said plate so that fluid discharged from said reactant fluid feed line impinges on the central portion of said plate and then flows toward the periphery thereof, the said reaction mixture and reactant fluid meeting in the area adjacent the periphery of said plate, and a cylindrical band spaced from the periphery of said plate defining an annular reaction zone adjacent said plate.

7. Apparatus for producing ammonium phosphate from ammonia, water and phosphoric acid comprising, in combination, a pair of concentric elongated conduits; inlet pipes for water and ammonia vapor reactants connected to one of said conduits at one end thereof; said one of said conduits having imperforate walls throughout substantially its entire length defining a mixing chamber for said reactants and communicating at the end remote from said one end with one end of the other conduit of said pair; said mixing chamber having baffle members spaced along the length thereof extending across the mixing chamber with the axis of each succeeding baffle member staggered relative to the adjacent baffle member to promote thorough mixing of the ammonia vapor and water reactants; an outlet pipe for the aqua ammonia communicating with the opposite end of said other conduit; a tank for a body of reaction mixture; a deflector plate fixedly mounted in said tank in a substantially horizontal plane; the said outlet pipe for the aqua ammonia passing into said tank and having its discharge outlet positioned close to said plate near the central portion thereof so that aqua ammonia discharged from said outlet pipe impinges on the central portion of one side of said plate and then flows toward the periphery thereof; a phosphoric acid feed line passing into said tank and having its discharge outlet positioned close to said plate near the central portion of the other side of said plate so that phosphoric acid discharged from said feed line impinges on the central portion of said plate and then flows toward the periphery thereof, the aqua ammonia and phosphoric acid meeting in the area adjacent the periphery of said plate; a cylindrical band spaced from and bounding the periphery of said plate defining an annular reaction zone adjacent said plate; and a surge hood, concentric with but displaced from said annular reaction zone, for circulating the reaction mixture through said tank.

References Cited in the file of this patent

UNITED STATES PATENTS

| | | |
|---|---|---|
| 2,031,939 | Donlan | Feb. 25, 1936 |
| 2,645,463 | Stearns | July 14, 1953 |
| 2,655,436 | Bishop et al. | Oct. 13, 1953 |
| 2,754,192 | Bray et al. | July 10, 1956 |
| 2,787,521 | Roberts et al. | Apr. 2, 1957 |
| 2,872,297 | Dugan | Feb. 3, 1959 |